(12) United States Patent
Licht et al.

(10) Patent No.: US 9,080,244 B2
(45) Date of Patent: Jul. 14, 2015

(54) PROCESS FOR IRON AND STEEL PRODUCTION

(71) Applicant: The George Washington University, Washington, DC (US)

(72) Inventors: Stuart Licht, Leesburg, VA (US); Baohui Wang, Daqing (CN)

(73) Assignee: The George Washington University, Washington, DC (US)

( * ) Notice: Subject to any disclaimer, the term of this patent is extended or adjusted under 35 U.S.C. 154(b) by 64 days.

(21) Appl. No.: 13/660,720

(22) Filed: Oct. 25, 2012

(65) Prior Publication Data

US 2013/0134050 A1 May 30, 2013

Related U.S. Application Data

(63) Continuation of application No. PCT/US2011/035176, filed on May 4, 2011.

(60) Provisional application No. 61/331,109, filed on May 4, 2010, provisional application No. 61/426,030, filed on Dec. 22, 2010, provisional application No. 61/438,610, filed on Feb. 1, 2011.

(51) Int. Cl.
*C25C 3/34* (2006.01)
*C25C 1/06* (2006.01)
*C21C 5/56* (2006.01)

(52) U.S. Cl.
CPC ... *C25C 1/06* (2013.01); *C21C 5/56* (2013.01); *C25C 3/34* (2013.01)

(58) Field of Classification Search
USPC .......................................... 205/365, 370, 741
See application file for complete search history.

(56) References Cited

U.S. PATENT DOCUMENTS

| | | | |
|---|---|---|---|
| 4,187,155 A | 2/1980 | de Nora et al. | |
| 5,069,771 A | 12/1991 | Nguyen et al. | |
| 5,185,068 A | 2/1993 | Sadoway | |
| 5,194,124 A * | 3/1993 | Leary | 205/362 |
| 2011/0100832 A1 | 5/2011 | Lubomirsky et al. | |
| 2012/0123087 A1 | 5/2012 | Bowles et al. | |

OTHER PUBLICATIONS

S. Licht, "Efficient Solar-Driven Synthesis, Carbon Capture, and Desalinization, STEP: Solar Thermal Electrochemical Production of Fuels, Metals, Bleach," Advanced Materials, Oct. 25, 2011, vol. 23, No. 47, pp. 5592-5612.

* cited by examiner

Primary Examiner — Arun S Phasge
(74) Attorney, Agent, or Firm — Blank Rome LLP (57) ABSTRACT

A method of producing iron by: solubilizing iron oxide as a lithiated iron oxide in a molten carbonate having lithium carbonate; and subjecting the lithiated iron oxide to electrolysis to obtain iron and oxygen. The molten alkali metal carbonate salt may further include lithium oxide. Additionally the lithium carbonate may be simultaneously subjected to electrolysis to produce steel instead of iron.

26 Claims, 5 Drawing Sheets

PROCESS FOR IRON AND STEEL PRODUCTION

CROSS REFERENCE TO RELATED APPLICATIONS

This application is a continuation of Application No. PCT/US2011/035176 (WO 2011/140209) filed May 4, 2011, which claims the benefit of U.S. Provisional Patent Application Nos. 61/438,610 filed on Feb. 1, 2011, 61/426,030 filed on Dec. 22, 2010, and 61/331,109 filed on May 4, 2010, all of which are incorporated by reference herein in their entirety.

BACKGROUND

This technology relates to a method and system of producing iron electrolytically using iron oxide as a starting material.

Iron is currently produced commercially in blast furnaces where iron ore is reduced by coke to cast iron. This millennia old, greenhouse gas emitting, carbothermal process is responsible for 25% of all carbon dioxide global released by industry. In order to reduce carbon dioxide emissions it is desirable to develop alternate processes to produce iron with a substantial reduction or elimination of carbon dioxide production.

Previous attempts to produce iron from naturally occurring materials by electrowinning have faced challenges and have not provided a pathway to the commercial, carbon dioxide-free production of iron. Attempts have included room temperature electrowinning, challenged by too high a voltage to be efficient, and molten iron oxides, which faced the material's challenges of very high temperature (hematite melts at 1565° C.). Non-naturally occurring iron materials have been used as a reactant. Non-naturally occurring starting materials represent additional costs—both environmentally and economically.

There remains a need in the art for a method of electrowinning iron from naturally occurring materials, at low voltage, at a temperature below that of the melting point of iron oxides, at high rate, and without carbothermal carbon dioxide emission.

BRIEF DESCRIPTION OF THE INVENTION

Disclosed herein is a method of producing iron comprising: solubilizing iron oxide as lithiated iron oxide in a molten carbonate comprising lithium carbonate; and subjecting the lithiated iron oxide to electrolysis to obtain iron and oxygen.

Also disclosed herein is a method of producing steel comprising: solubilizing iron oxide as lithiated iron oxide in a molten carbonate comprising lithium carbonate; and subjecting the lithiated iron oxide and the lithium carbonate to electrolysis to obtain steel and oxygen.

DETAILED DESCRIPTION

As described herein a molten carbonate or a combination of molten carbonates are used as the electrolyte when producing iron or steel from iron oxide. Prior to the work described herein, it was thought that iron oxide had extremely limited solubility in molten alkali metal carbonates, more specifically on the order of $10^{-5}$ to $10^{-4}$ M at 650° C. The limited solubility of iron oxide thus restricted the use of molten carbonates as an electrolyte in electrowinning iron from iron oxide. Surprisingly it has been found that lithiated iron oxide has dramatically increased solubility in molten carbonates compared to non-lithiated iron oxide as well as the sodium and potassium equivalents of the lithiated iron oxide. The solubility of lithiated iron oxide in molten carbonates enables the use of molten carbonates as an electrolyte for the electrodeposition of iron. The increased concentration of iron oxide in the electrolyte decreases the energy voltage required for iron electrowinning.

Molten carbonates include alkali carbonates such as lithium carbonate, sodium carbonate, potassium carbonate and mixtures of two or more of the foregoing alkali carbonates. Mixtures of alkali carbonates can be advantageous due to lower melting points. For example $Li_{0.7}Na_{0.93}CO_3$ has a melting point of 499° C. and $Li_{0.85}Na_{0.61}K_{0.54}CO_3$ has a melting point of 393° C. and these melting points are compared to the melting points of alkali carbonates ($Li_2CO_3$ 723° C., $Na_2CO_3$ 851° C., $K_2CO_3$ 891° C.).

In one embodiment the lithiated iron oxide is formed by the ready dissolution of iron oxides, such as the commonly occurring salts $Fe_2O_3$ or $Fe_3O_4$, at temperatures greater than 393° C. in molten lithium carbonate or into a molten mix of carbonates comprising lithium carbonate. In the absence of lithium carbonate, such as in pure sodium or potassium carbonate, or a mix of the two, the solubility of iron oxide is very low, while in the presence of lithium carbonate, the solubility is high and increases with temperature. For example, at 950° C. the solubility in $Na_2CO_3$ is less than 0.1 molal (m) of dissolved Fe(III), while it is up to 14 m in $Li_2CO_3$. Iron oxides are also soluble in mixed carbonates which comprise $Li_2CO_3$. For example, in $Li_{0.87}Na_{0.63}K_{0.50}CO_3$, Fe(III) solubility increases from 0.7 m at 450° C. up to 4 m at 950° C. It is also contemplated that the lithium ions needed for the formation of the lithiated iron oxide may be provided by another lithium salt, such as lithium chloride, lithium sulphate and the like.

The initial addition of the iron oxide is accompanied by release of carbon dioxide, which is eliminated when one equivalent of $Li_2O$ is added for each equivalent of dissolved $Fe_2O_3$. Without being bound by theory $Fe_2O_3$ is observed to be dissolved as $LiFeO_2$. In either case, further dissolution of $Li_2O$ is not needed to sustain the electrowinning. For example, electrolysis of $LiFeO_2$ produces Fe and releases $Li_2O$; iron is replenished by the addition of further iron oxide, such as $Fe_2O_3$, which dissolves with the accumulated, released $Li_2O$ in the carbonate. Hence, additional $Li_2O$ is not required when the addition of iron oxide occurs at a rate that is similar to the rate at which $Li_2O$ is released.

In one embodiment the electrowinning electrolyte stability is enhanced with carbon dioxide gas or with excess $Li_2O$ added to the molten carbonate. Molten $Li_2CO_3$, open to the air, is highly stable at 750° C., but slowly decomposes at 950° C. into $Li_2O$ and $CO_2$. This decomposition at higher temperature is inhibited, or prevented, when the molten $Li_2CO_3$ contains excess dissolved $Li_2O$ or when heated under carbon dioxide, rather than air.

In one embodiment steel, rather than iron, is directly formed from iron oxide salts, such as the commonly occurring salts $Fe_2O_3$ or $Fe_3O_4$, by electrowinning in molten carbonate and applying higher electrowinning potentials to co-deposit iron and carbon from molten carbonates For example, without being bound by theory, carbon is formed by the electrolysis of lithium carbonate as: $Li_2CO_3 \rightarrow C + Li_2O + O_2$ Carbonate is not lost as consumed carbonate is replenished with carbon dioxide, without being bound by theory, in accord with: $Li_2O + CO_2 \rightarrow Li_2CO_3$. At higher electrowinning potentials in molten carbonate containing iron oxide, iron containing carbon is formed by coreduction of the dissolved iron oxide and $CO_2$, dissolved as carbonate, for example from $Fe_2O_3$, without being bound by theory, as: $Fe_2O_3 + x CO_2 \rightarrow 2FeC_{x/2} + (3/2+x)O_2$.

In one embodiment common impurities found in iron oxide salts do not prevent high solubility of iron oxides in molten lithium carbonate. These impurities also do not dissolve beyond a measured solubility limit, and this facilitates electrowinning of low purity iron oxide ores. The predominant iron ores are hematite ($Fe_2O_3$) and magnetite ($Fe_3O_4$). These ores also commonly contain various levels of silica, and alumina. $SiO_2$ and $Al_2O_3$ dissolve in molten lithium carbonate as $Li_2SiO_3$ and $LiAlO_2$. In 750° C. $Li_2CO_3$ the respective solubility is 0.06 m $Al_2O_3$, or 0.4 m $SiO_2$, and increase with increasing temperature. Dissolution of 0.4 m $SiO_2$ in 750° C. molten lithium carbonate decreases the solubility of Fe(III) (dissolved as $Fe_2O_3$) by only a small fraction (less than 10 percent). Furthermore, iron tends to electrowin in carbonate melts without contamination due to the reduction of common impurities found in iron oxide salts. Examples of impurities include in addition to silicon and aluminium salts, alkali salts, magnesium salts, barium salts, manganese salts, titanium salts, chromium salts, beryllium salts and zinc salts. The standard electrode potential for the elements consisting of the Li, Na, K, Al, Mg, Ba, Mn, Zn, Cr, Ti, Si and Be are each more negative than that of iron, and the salts of these metals tend to require a substantially greater electrodeposition potential than those of comparable iron salts Iron oxides may be dissolved in carbonates at temperatures as low as 393° C. (eutectic carbonate) or as high over 1000° C. for electrowinning of iron. Higher temperatures provide the advantages of greater iron oxide solubility, and higher current density at electrowinning at lower electrowinning potential. The lower temperature carbonates provide the advantage of enhanced durability of electrowinning cell components (electrodes, cell container and electrolyte) and lower solubility of common iron oxide ore impurities.

The anode can be made of any inert material which is stable under the operating conditions of the cell. The inert anode can be designed to promote an oxygen evolution reaction at low electrolysis potentials. Effective materials include metals, such as nickel, platinum or iridium, metal oxides such as nickel oxide, metal alloys such as monel and inconel, and carbon based materials such as glassy carbon and graphite. Enhanced anode surface area, such as with screen or spongy materials, by physical roughening, by chemical or electro-chemical etching, or as deposited on a conductive support, will decrease electrolysis potential.

The cathode can be made of any conductive material stable under the operating temperature of the cell. For convenience however it is generally desirable for the cathode to be made of iron.

The electrolytic reaction is conducted at a temperature greater than the melting point of the molten carbonate (or combination of carbonates) used as the electrolyte. In some embodiments the temperature of the electrolytic reaction is 0 to 300 degrees greater than the melting point of the carbonate. Exemplary temperatures are 723 to 1000° C. when the molten carbonate is lithium carbonate.

The electrolytic cell can be operated at a current density of 1 milliAmpere per square centimeter ($mA/cm^2$) to 10 Ampere per square centimeter ($A/cm^2$) Within this range the current density can be greater than or equal to 100 $mA/cm^2$ to ensure greater rate of iron production. Also within this range the current density can be less than or equal to 5 $A/cm^2$ to ensure lower electrowinning voltage. Higher temperatures and higher concentrations of lithiated iron oxide provide the advantages of higher current density while electrowinning at lower electrowinning potential. For example electrowinning is performed at current densities ≥1 $A/cm^2$ in 950° C. lithium carbonate with dissolved, concentrated iron oxide. These current densities can be expected to increase ten-fold to ≥10 $A/cm^2$ when planar (flat) electrodes are replaced with surface area enhanced electrodes. On the planar electrodes, temperature and concentration are sufficient in the eutectic mix (at T≥550° C., dissolved iron oxide concentrations are ≥1 molal in the eutectic mix) to support ≥100 $mA/cm^2$, and at T>750° C. in lithium carbonate, solubilities are ≥7 molal, to access >0.5 $A/cm^2$.

Iron is reduced and deposited on the cathode. Salt may become trapped in the deposited material. The deposited iron may be separated from any trapped salt by grinding the deposited material and washing with deionized water.

The above discussed methods are further explained in the following non-limiting examples.

EXAMPLES

Example 1

Experiments were conducted to demonstrate electrowinning of $Fe_2O_3$ in molten carbonates. Addition of a lithium salt to molten carbonate adds lithium cations. The melt is then, in part, lithium carbonate. Lithium carbonate, $Li_2CO_3$, provides a simple salt to demonstrate solubilizing $Fe_2O_3$. 16 grams (g) of $Fe_2O_3$ were added to 80 g of $Li_2CO_3$, and heated together to 800° C. in a 75 milliliter (ml) alumina crucible. The $Fe_2O_3$ fully dissolved to form a red-brown solution. Alternatively, when heated to 800° C. without $Fe_2O_3$, 80 g of $Li_2CO_3$ forms a clear (colorless) liquid, and then forms a red-brown solution upon addition of the 16 g of $Fe_2O_3$. A 3 cm×4 cm piece of Ni foil was suspended in the molten mixture to function as the anode. A coiled 2.8 square cm Pt wire (18 cm long, 0.5 millimeter (mm) diameter) was suspended in the molten mixture to function as the cathode. A current of 0.5 A was applied for 2.3 hours while the temperature was maintained at 800° C. 4.8 g of material was deposited on the cathode. When the coiled platinum wire was replaced by an iron wire, similar results were obtained. The platinum wire experiment serves to illustrate the iron product originates solely from the $Fe_2O_3$ which was added to the $Li_2CO_3$. The extracted deposited mass contained pure iron metal and trapped salt. The deposited mass was washed to remove the trapped salt by (1) grinding to a fine powder, (2) sonication in water for 30 minutes, (3) settling for 0.5 minute, then pouring off the colloidal suspension and liquid from the precipitate. Steps 2 and 3 were repeated several times with the precipitate, which was observed to be reflective, grey, metallic, and responsive to a magnet. This was followed by further washing, sonicating and decanting the precipitate respectively in methanol, acetone and n-hexane (n-hexane wash was not necessary, but demonstrated that carbon was not present), followed by 10 minutes of vacuum drying and weighing. The material was ground and washed with deionized water to remove any trapped salts. The amount of iron obtained was 0.8 g. As an alternative to the alumina crucible, a nickel crucible was also used, in which case the crucible also served as a large surface area anode. The electrowinning potential measured for a range of constant current densities, J, is shown below in Table 1. J is determined by the cathode surface area. The subscript SA in E denotes a small (4-fold excess), and LA a large, (60-fold excess), surface area of anode. The measured potentials were similar with smooth platinum or iron cathodes, and with anodes of smooth platinum or Ni (nickel oxide, prepared as McMaster 200 pure Ni sheet). E was stable during continuous electrolysis at this range of J.

TABLE 1

Experimental constant current full cell potentials at smooth electrodes for the electrolysis of 1:5 $Fe_2O_3$ in 800° C. $Li_2CO_3$.

| $J(mA/cm^2)$ | 3 | 20 | | 200 | 500 |
|---|---|---|---|---|---|
| $E_{LA}(Fe_2O_3)_{LA}$ | 0.85 V | 1.18 V | | 1.40 V | 1.70 V |
| $J(mA/cm^2)$ | 7 | 18 | 70 | 200 | |
| $E_{SA}(Fe_2O_3)_{SA}$ | 1.15 V | 1.25 V | 1.57 V | 1.70 V | |

Figure 1:
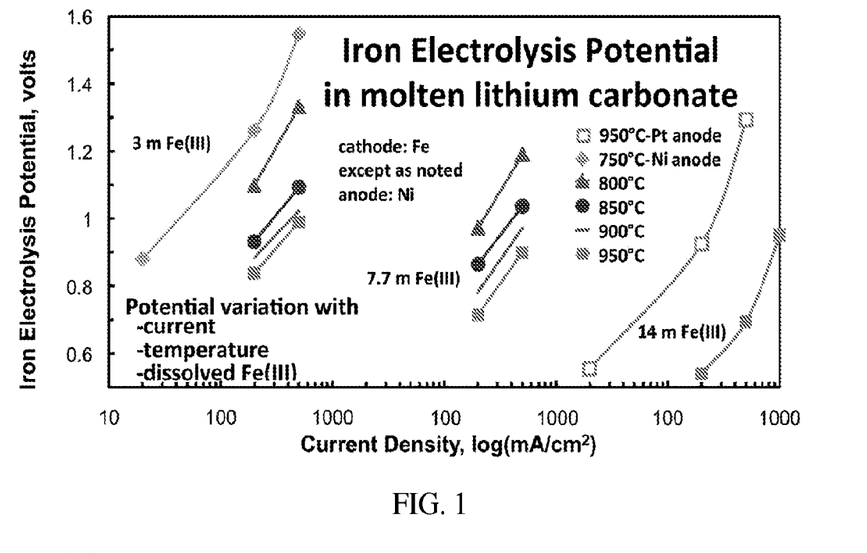
FIG. 1 shows the measured electrolysis potentials of iron for dissolved Fe(III) in molten $Li_2CO_3$ as described in Example 1.

Each dissolved $Fe_2O_3$ results in two Fe(III) in the molten carbonate electrolyte. The measured electrolysis potentials of iron, for dissolved Fe(III) in molten $Li_2CO_3$, are shown in FIG. 1 as a function of the electrolyte temperature and the concentration of dissolved iron. The measured electrolysis potential presented in FIG. 1 for dissolved Fe(III) in molten lithium carbonate is low. For example 0.7 Volts (V) sustains a current density of 500 mA/cm² in 14 m Fe(III) in $Li_2CO_3$ at 950° C. The cell contained excess anode surface area and the full cell electrolysis potentials were measured as a function of constant current, with current density constrained by the cathode surface area. The electrowinning voltage falls with increasing Fe(III) concentration, which without being bound by theory, is consistent with the general trend of the Nernst Equation—decrease of the electrolysis potential with increasing Fe(III) concentration, as $6.6 \times 10^{-5} V \times T$(electrolysis,K)/K (=RT/nF), which is accentuated by high temperature. The electrowinning voltage also falls with increasing temperature, which without being bound by theory, is consistent with both the enhanced conductivity and mass diffusion at higher temperature and the trend of the thermodynamic free energy of formation of the reaction:

$$Fe_2O_3 \rightarrow 2Fe + 3/2 O_2$$

Example 2

Experiments were conducted to demonstrate electrowinning of $Fe_3O_4$, rather than $Fe_2O_3$, in molten carbonates. 16 g of $Fe_3O_4$ was added to 80 g of $Li_2CO_3$, and heated together to 800° C. in a 75 ml alumina crucible. The $Fe_3O_4$ fully dissolved to form a black solution. A 3 cm×4 cm piece of Ni foil was suspended in the molten mixture to function as the anode. A coiled, 7 square cm iron wire (1.5 mm diameter, 15 cm length) was suspended in the molten mixture to function as the cathode. In two separate experiments, a current of 1.4 A (200 mA/cm²) or 0.14 A (20 mA/cm²) was applied for 1 hour while the temperature was maintained at 800° C. As with the $Fe_2O_3$ case, the extracted cooled electrode, following extended electrolysis and iron formation, contained trapped electrolyte. The deposited material was treated as described in Example 1 without the hexane wash. The deposited product weight was consistent, without being bound by theory, with a complete 8 electron per $Fe_3O_4$ coulombic reduction to iron metal, in accord with:

$$Fe_3O_4 \rightarrow 3Fe + 2O_2$$

The electrowinning potential measured for a range of constant current densities, J, in the $Fe_3O_4 Li_2CO_3$ mix was tabulated as described in Example 1 and shown in Table 2.

TABLE 2

Experimental constant current full cell potentials at smooth electrodes for the electrolysis of 1:5 $Fe_3O_4$ in 800° C. $Li_2CO_3$.

| $J(mA/cm^2)$ | 18 | 200 | 500 |
|---|---|---|---|
| $E_{LA}(Fe_3O_4)_{LA}$ | | 0.60 V | 0.90 V |
| $E_{SA}(Fe_3O_4)_{SA}$ | 1.27 V | 1.70 V | |

Example 3

Experiments were conducted to determine the solubility of iron oxides in molten carbonates. In the absence of lithium carbonate, such as in pure sodium or potassium carbonate, or a mix of the two, the solubility of iron oxide is low, while in the presence of lithium carbonate, the solubility is high and increases with temperature. The amount of dissolved iron oxide was measured in molal units, as m, for example as x m Fe(III), where "m Fe(III)" refers to "moles Fe(III) dissolved per kilogram of carbonate". In lithium carbonate, the lithiated iron oxide was soluble up to 7 m Fe(III) at 750° C., and up to 14 m Fe(III) at 950° C. At 950° C. the solubility in $Na_2CO_3$ was less than 0.1 m Fe(III) and in $K_2CO_3$ less than 0.2 m Fe(III). In $Li_{0.87}Na_{0.63}K_{0.50}CO_3$, the solubility increased from 0.7 m at 450° C. up to 4 m Fe(III) at 950° C.

Figure 2:
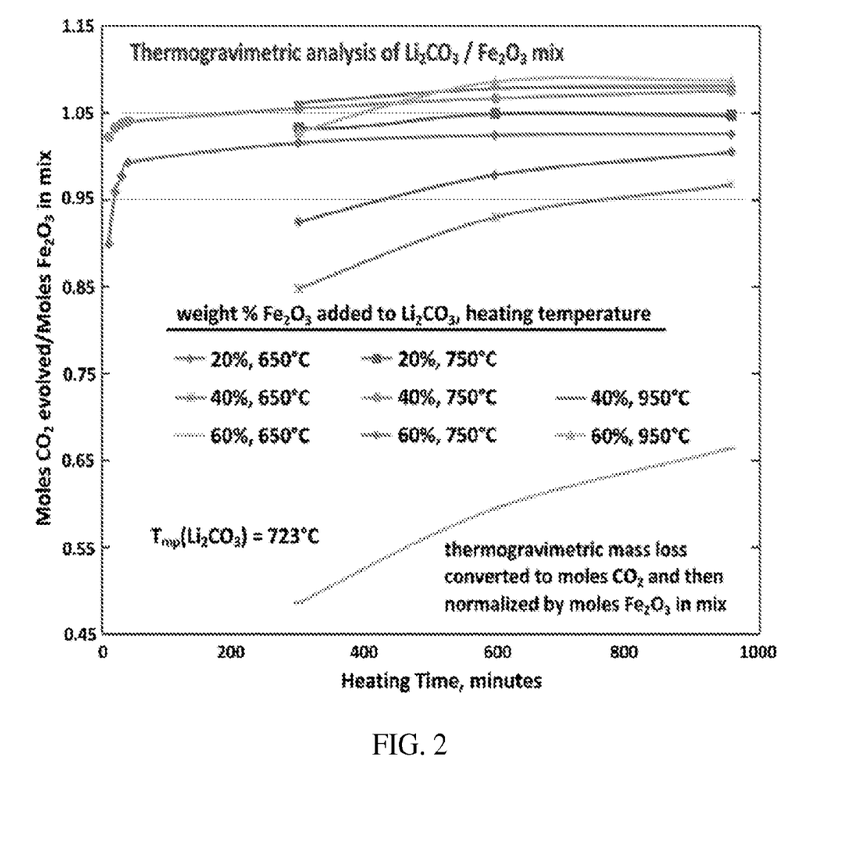
FIG. 2 shows the thermogravimetric analysis described in Example 3.

In $Li_2CO_3$, without added $Li_2O$, 1 equivalent of $CO_2$ was released for each dissolved $Fe_2O_3$ over a wide range of temperatures and concentrations, as seen in FIG. 2, and without being bound by theory in accord with:

$$Fe_2O_3 + Li_2CO_3 \rightarrow 2LiFeO_2 \text{ (dissolved)} + CO_2 \text{ (gas)}$$

As indicated in the figure key, the mixture was composed of either 20, 40 or 60 weight percent of $Fe_2O_3$ in $Li_2CO_3$. The mass loss over time was measured at the indicated constant temperature of either 650, 750 or 950° C., and corrected for $CO_2$ evolution measured from the 100% $Li_2CO_3$ melt, then converted to moles of $CO_2$, and finally normalized by the moles of $Fe_2O_3$ in the lithium carbonate ferric oxide mix.

When 1 equivalent of $Li_2O$ was added with each equivalent of $Fe_2O_3$, the $Fe_2O_3$ also dissolved, but no carbon dioxide was released. Without being bound by theory this is in accord with:

$$Fe_2O_3 + Li_2O \rightarrow 2LiFeO_2 \text{ (dissolved)}$$

Figure 3:
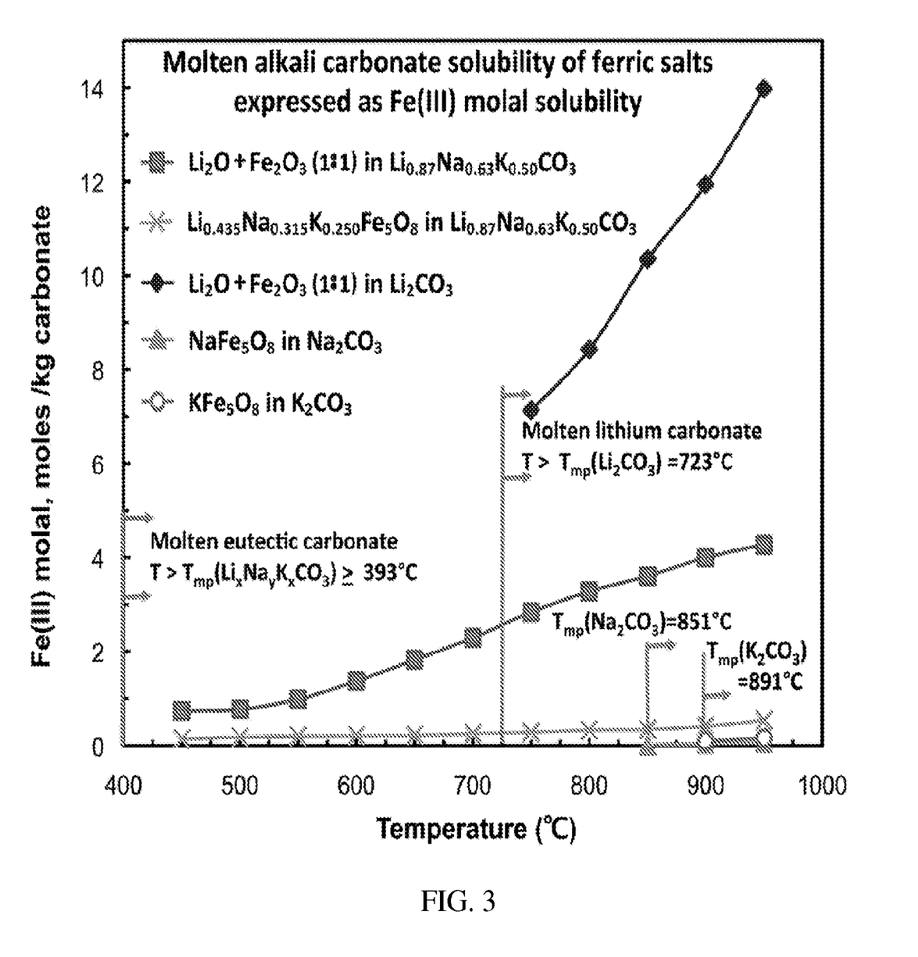
FIG. 3 shows the solubility of $Fe_2O_3$ as described in Example 3.

Dry $LiFeO_2$ was also formed by ball milling a 1:1 equivalent ratio of dry $Fe_2O_2$ with dry $Li_2CO_2$, which displays the same the same solubility as $Li_2O + Fe_2O_2$ directly added to molten $Li_2CO_2$. The solubility of $Fe_2O_3$ in a wide range of carbonate conditions was measured and is presented in FIG. 3.

Without being bound by any theory, it is believed that electrowinning of $LiFeO_2$(dissolved) forms Fe and dissolved $Li_2O$; iron is replenished by the addition of further iron oxide, which is dissolved into the carbonate in combination with the released $Li_2O$. Thus electrowinning occurs without the consumption of the electrolyte as:

Iron Production in carbonate, $Li_2O$ unchanged (I+II):
$Fe_2O_3 \rightarrow 2Fe + 3/2O_2$ I dissolution in molten carbonate $Fe_2O_3 + Li_2O \rightarrow 2LiFeO_2$ II electrolysis, $Li_2O$ regeneration: $2LiFeO_2 \rightarrow 2Fe + Li_2O + 3/2O_2$ Example 4

The electrowinning electrolyte stability was enhanced with carbon dioxide gas or with excess $Li_2O$ added to the molten carbonate. Molten $Li_2CO_3$, open to the air, is highly stable at 750° C., but slowly decomposes at 950° C. into $Li_2O$ and $CO_2$. This decomposition at higher temperature was inhibited, or prevented, when the molten $Li_2CO_3$ contained excess dissolved $Li_2O$ or when heated under carbon dioxide, rather than air. When decomposition occurs, the $CO_2$ is released as a gas, and the $Li_2O$ dissolves or precipitates beyond the solubility limit.

Figure 4:
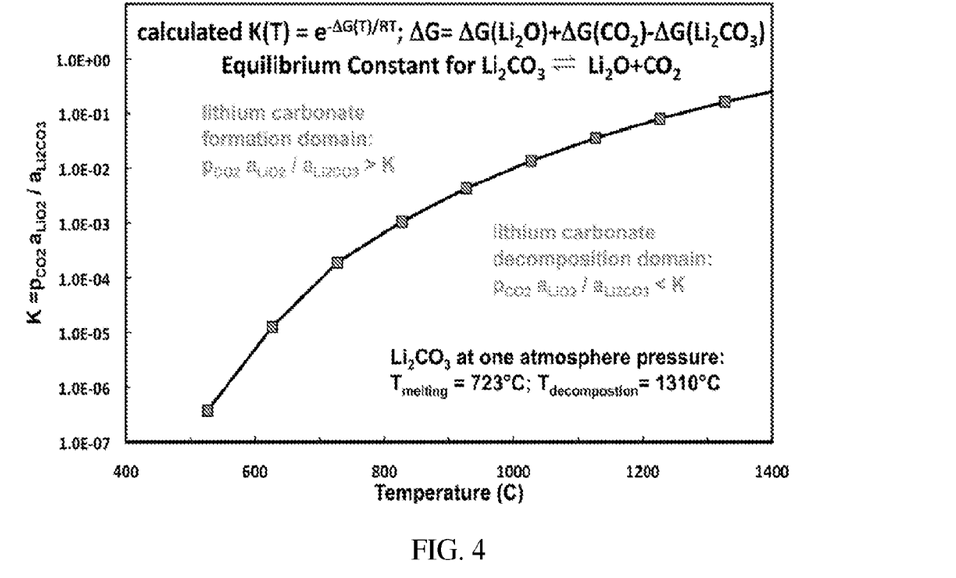
FIG. 4 shows the calculated thermodynamic equilibrium constant as a function of temperature as described in Example 4.
Figure 5:
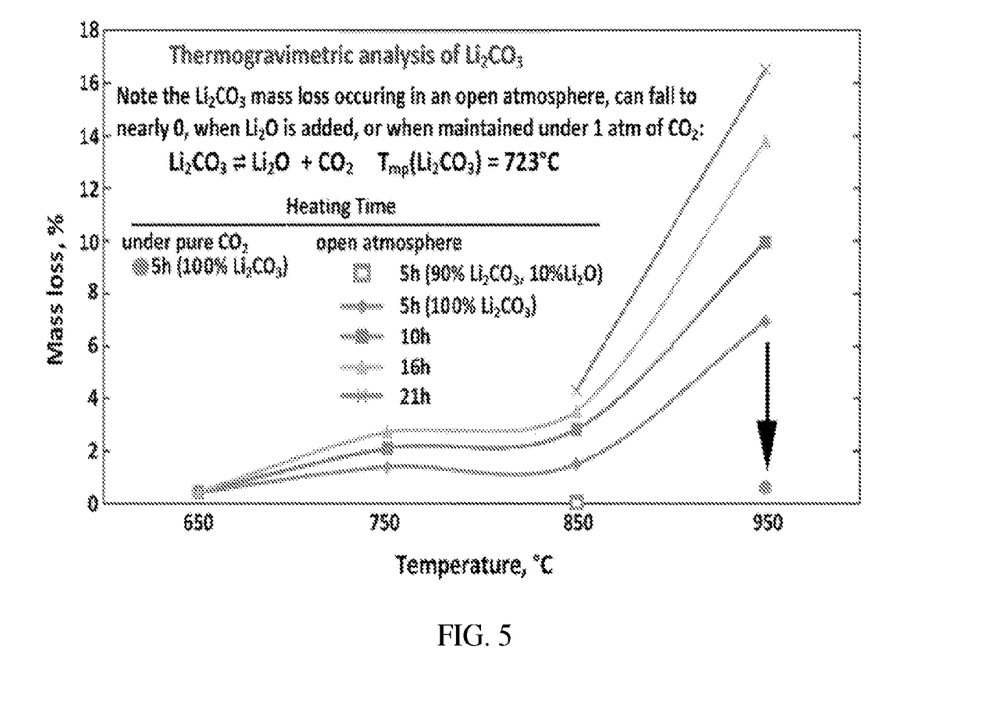
FIG. 5 shows the thermogravimetric analysis of lithium carbonate described in Example 4.

Using the known thermochemical data provided by the US National Institute of Standards and Technology Chemweb for $Li_2O$, $CO_2$ and $Li_2CO_3$ the reaction free-energy of $Li_2O + CO_2 \rightarrow Li_2CO_3$, was calculated to determine the thermodynamic equilibrium constant as a function of temperature. From this equilibrium constant, the area above the curve in FIG. 4 presents the thermodynamic wide domain in which $Li_2CO_3$ dominates, that is where excess $CO_2$ reacts with $Li_2O$ such that $p_{CO_2} \cdot a_{Li_2O} < a_{Li_2CO_3}$. This was experimentally verified in the measured thermogravimetric analysis of $Li_2CO_3$, shown in FIG. 5, and when $Li_2O$ was dissolved in molten $Li_2CO_3$, and injected with $CO_2$ (gas). Through the measured mass gain, a rapid reaction to $Li_2CO_3$ was observed. When $CO_2$ was flowed into a solution of 5% by weight $Li_2O$ in molten $Li_2CO_3$ at 750° C., the rate of mass gain was only limited by the flow rate of $CO_2$ into the cell (using an Omega FMA 5508 mass flow controller) to react one equivalent of $CO_2$ per dissolved $Li_2O$. As seen in the thermogrametric analysis in the second figure below, the mass loss over time of heated lithium carbonate heated in an open atmosphere (−0.03% $CO_2$) was slow up to 850° C., but accelerated at 950° C. However the mass loss falls to nearly zero when heated under pure (1 atm) $CO_2$. Also without being bound by any theory, in accord with $Li_2O + CO_2 \rightarrow Li_2CO_3$, added $Li_2O$ shifts the equlibrium to the left and inhibits carbonate decomposition. As seen in FIG. 5 in the open atmosphere molten 100% $Li_2CO_3$ at 850° C. loses mass, while a mixture of 90% by weight $Li_2CO_3$ and 10% $Li_2O$ exhibits little mass loss over time.

Example 5

Experiments were conducted and calculations performed to demonstrate that carbon may be formed in molten carbonate electrolyte, thus allowing the codeposition of iron and carbon (steel) at high electrowinning potentials.

Steel, rather than iron, was directly formed from iron oxide salts, such as the commonly occurring salts $Fe_2O_3$ or $Fe_3O_4$, by applying higher electrowinning potentials to co-deposit iron and carbon from molten carbonates. For example, without being bound by theory, carbon is formed by the electrolysis of lithium carbonate as:

$Li_2CO_3 \rightarrow C + Li_2O + O_2$

Carbonate was replenished with carbon dioxide, without being bound by theory in accord with:

$Li_2O + CO_2 \rightarrow Li_2CO_3$

At higher electrowinning potentials in molten carbonate containing iron oxide, without being bound by theory, steel containing carbon was formed as:

$Fe_2O_3 + xCO_2 \rightarrow 2FeC_{x/2} + (3/2 + x)O_2$

Figure 6:
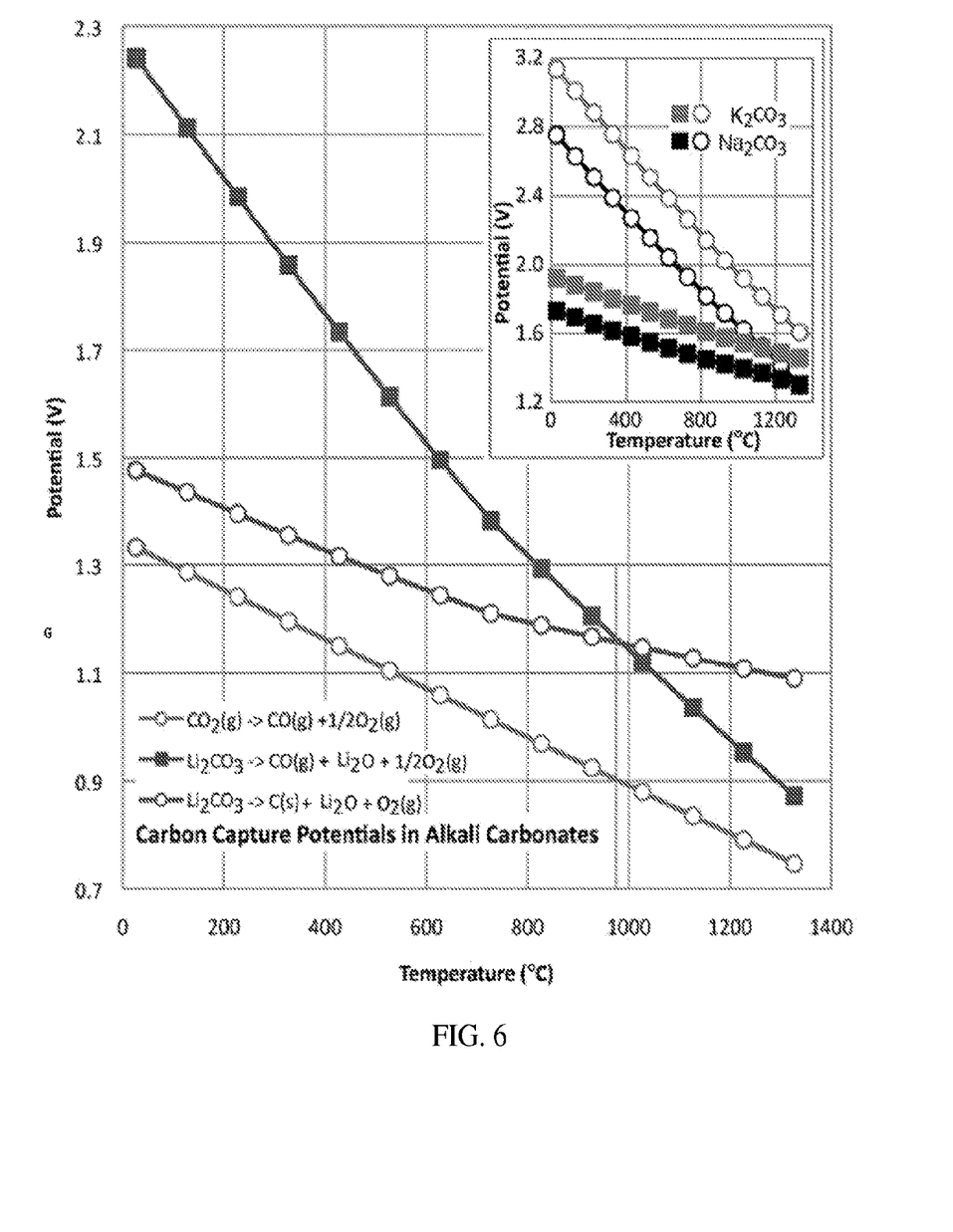
FIG. 6 shows the calculated electrolysis potential as described in Example 5.

Using the known thermochemical data provided by the US National Institute of Standards and Technology Chemweb for $Li_2O$, $CO_2$, C, CO, and the alkali oxides and carbonates the reaction free-energy of $Li_2O + CO_2 \rightarrow Li_2CO_3$, was calculated to determine the thermodynamic equilibrium constant as a function of temperature, and is presented in FIG. 6. As summarized in the FIG. 6, molten lithium carbonate, $Li_2CO_3$, provides a preferred, low energy route compared to $Na_2CO_3$ or $K_2CO_3$, for the conversion of $CO_2$, via a $Li_2O$ intermediate, to carbon.

Figure 7:
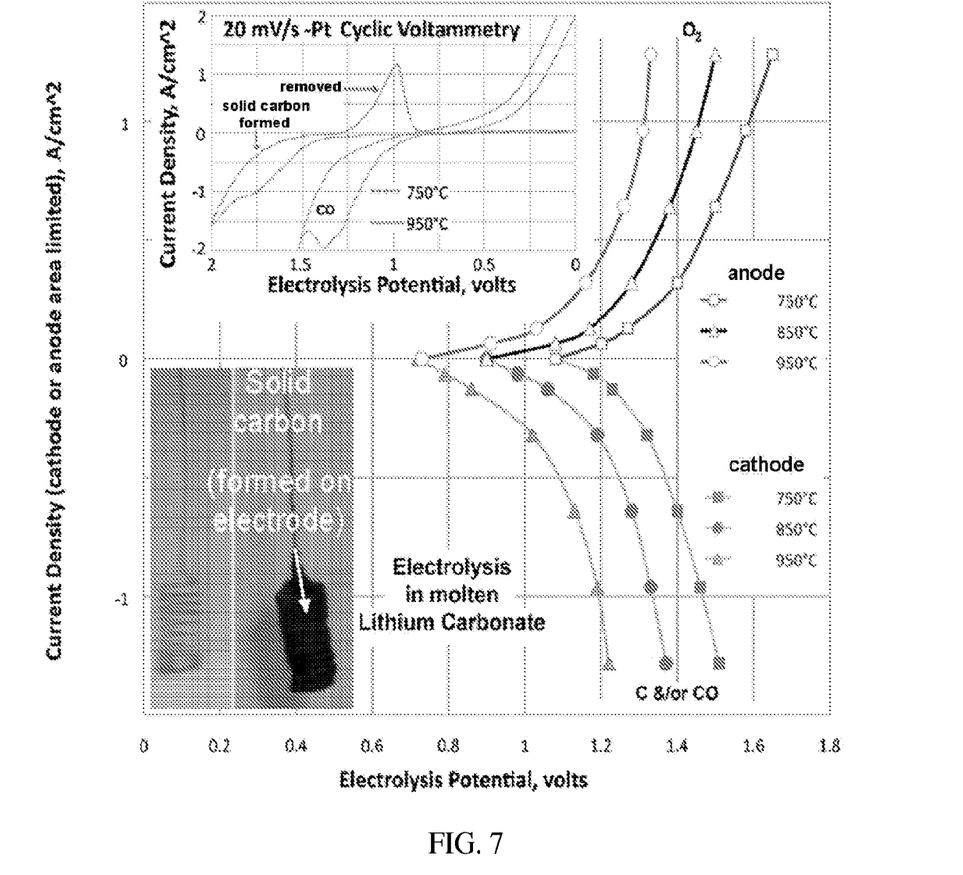
FIG. 7 is a photograph, cyclic voltammetry and electrolysis potential as described in Example 5.

As seen in the photograph inset of the FIG. 7, at 750° C., carbon dioxide is electrolytically reduced in molten lithium carbonate electrolyte to solid carbon. The carbon formed in the electrolysis in molten $Li_2CO_3$ at 750° C. is quantitative in accord with the 4 e-reduction of carbon dioxide. As seen in the cyclic voltammetry in FIG. 7, the transition to a carbon monoxide product is observed with increasing temperature. Specifically, while at 750° C. solid carbon is the main product at 950° C. the CO is the sole product. Hence, switching between the C or CO product is temperature programmable. The electrolysis potential to reduce lithium carbonate, is recorded in FIG. 7 as a function of either cathode (with an oversized anode) current density or anode (with an oversized cathode) current density.

Example 6

Experiments were conducted to demonstrate effective anodes in the molten carbonate electrolyte. The oxygen product at the anode will occur during electrolysis in molten lithium carbonate with or without (as in the previous example) dissolved iron oxide. In the FIG. 7 above, the anode is platinum, and in addition a variety of other materials are effective anodes as summarized below. The anode can be made of any inert material which is stable under the operating conditions of the cell. The inert anode can be designed to promote an oxygen evolution reaction at low electrolysis potentials. Effective materials include metals, such as nickel, platinum or iridium, as shown in Table 3, metal oxides such as nickel oxide, metal alloys such as monel and inconel, and conductive carbon based materials such as glassy carbon and graphite. The data in Table 3 was obtained with smooth anodes. The nickel crucible walls were used as an oversized cathode. Enhanced anode surface area, such as with screen or spongy materials, by physical roughening, by chemical or electrochemical etching, or as deposited on a conductive support, will decrease electrolysis potential. Metals, such as nickel, when employed as oxygen generating anodes are effectively also metal oxides, quickly forming a thin nickel oxide layer which promotes oxygen formation. Hence, when a 62 micron thick nickel foil was immersed and used as an anode for electrolysis at 100 mA/cm² in 1.77 m $Fe_2O_3$, 7.08 m $Li_2O$ at 750° C. in molten lithium carbonate for 90 seconds, approximately 2 micron of the nickel was converted to the oxide, and this value was unchanged after 2 hours of continuous electrolysis. However, the nickel anode becomes unstable at higher temperature, for example after two hours of 100 mA/cm$^2$ electrolysis in the same electrolyte, at 850° C. or 950° C., respectively 7 or 9 microns of nickel are converted to the oxide. Inconel and monel nickel alloys are also active as anodes, however at 950° C. the monel alloy anode quickly corrodes, presumably due to oxidation of the copper component of the alloy. The stability of an iridium anode was measured at high temperature, 850° C., before, and after long term electrolysis at higher current density, 1000 mA/cm$^2$, and showed no deformation or observable change. Specifically, the experiment was conducted with a 0.473 cm$^2$ iridium wire at 1000 mA/cm$^2$ in an Li$_2$CO$_3$ electrolyte containing as 1.77 m Fe$_2$O$_3$ and 3.54 m Li$_2$O for 8 hours at 850° C. The diameter and integrity of the iridium was the same before and after the extended electrolysis.

TABLE 3

| Potential | J/mA cm$^{-2}$ | | | | | Anode | Cathode | Li$_2$O |
|---|---|---|---|---|---|---|---|---|
| mV | 3 | 20 | 200 | 500 | 1000 | Anode | Cathode | molal, m |
| E(750° C.) | — | 40 | 151 | 260 | 475 | Ni(0.479 cm$^2$) | Ni(28 cm$^2$) | 5.31 |
| E(750° C.) | — | 71 | 196 | 310 | 535 | Ir(0.473 cm$^2$) | Ni(28 cm$^2$) | 5.31 |
| E(750° C.) | — | 57 | 236 | 371 | 778 | Pt(0.473 cm$^2$) | Ni(28 cm$^2$) | 5.31 |
| E(750° C.) | — | 42 | 159 | 310 | 615 | Ni(0.479 cm$^2$) | Ni(28 cm$^2$) | 3.71 |
| E(750° C.) | — | 66 | 212 | 339 | 787 | Ir(0.473 cm$^2$) | Ni(28 cm$^2$) | 3.71 |
| E(750° C.) | — | 71 | 227 | 380 | 947 | Pt(0.473 cm$^2$) | Ni(28 cm$^2$) | 3.71 |
| E(750° C.) | — | 335 | 1048 | 1265 | 1408 | Ni(0.479 cm$^2$) | Ni(28 cm$^2$) | 0 |
| E(750° C.) | 155 | 310 | 1246 | 1586 | 1741 | Ir(0.473 cm$^2$) | Ni(28 cm$^2$) | 0 |
| E(750° C.) | — | 370 | 1258 | 1676 | 1888 | Pt(0.473 cm$^2$) | Ni(28 cm$^2$) | 0 |

Example 7

Experiments were conducted to demonstrate that common impurities found in iron oxide salts do not prevent high solubility of iron oxides in molten lithium carbonate. These impurities do not dissolve beyond a measured solubility limit, and this facilitates electrowinning of low purity iron oxide ores. The predominant iron ores are hematite (Fe$_2$O$_3$) and magnetite (Fe$_3$O$_4$). These ores also commonly contain various levels of silica, and alumina. SiO$_2$ and Al$_2$O$_3$ dissolve in molten lithium carbonate as Li$_2$SiO$_3$ and LiAlO$_2$. In 750° C. Li$_2$CO$_3$ the respective solubility was 0.4 m SiO$_2$ and 0.06 m Al$_2$O$_3$. Dissolution of 0.4 m SiO$_2$ in 750° C. molten lithium carbonate decreases the solubility of dissolved Fe(III) (dissolved as Fe$_2$O$_3$) by only a small fraction (less than 10 percent). The solubility of either Al$_2$O$_3$ or SiO$_2$ in molten lithium carbonate increases with increasing temperature, and at 950° C. was 0.6 m Al$_2$O$_3$ and 4 m SiO$_2$. High concentrations of dissolved lithium oxide have only a small effect on the solubility of silica or alumina in lithium carbonate. At 750° C. lithium carbonate containing 7 m Li$_2$O, the solubility was 0.06 m Al$_2$O$_3$ and 0.5 m SiO$_2$. Furthermore, iron tends to electrowin in carbonate melts without contamination due to the reduction of common impurities found in iron oxide salts. Such impurities include, in addition to silicon and aluminium salts, alkali salts, magnesium salts, barium salts, manganese salts, titanium salts, chromium salts, beryllium salts and zinc salts. Specifically, the standard electrode potential for the elements Li, Na, K, Al, Mg, Ba, Mn, Zn, Cr, Ti, Si and Be are each more negative than that of iron, and the salts of these metals tend to require a substantially greater electrolysis potential than those of comparable iron salts. Hence, electrolysis voltage, as well as solubility limitations, also inhibits adverse effects on the iron electrowinning, as common impurities in iron oxides tend to have a high voltage barrier to electrowinning.

All ranges disclosed herein are inclusive and combinable (e.g., ranges of "up to about 25 wt %, or, more specifically about 5 wt % to about 20 wt %" is inclusive of the endpoints and all intermediate values of the ranges of "about 5 wt % to about 25 wt %," etc.). The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method of producing iron comprising:
   (i) solubilizing iron oxide in a molten carbonate comprising lithium carbonate to form a lithiated iron oxide; and
   (ii) subjecting the lithiated iron oxide to electrolysis to obtain iron and oxygen.

2. The method of claim 1, wherein the iron oxide comprises Fe$_2$O$_3$.

3. The method of claim 1, wherein the molten carbonate is a mixed eutectic molten carbonate.

4. The method of claim 1, wherein the molten carbonate further comprises Li$_2$O.

5. The method of claim 1, wherein the iron oxide comprises Fe$_3$O$_4$.

6. The method of claim 1, wherein the iron oxide comprises impurities.

7. The method of claim 1, wherein step (ii) occurs with carbon dioxide in contact with the molten carbonate.

8. The method of claim 1, wherein the solubilizing in step (i) comprises dissolving iron oxide in the molten carbonate.

9. The method of claim 1, wherein the solubilizing in step (i) comprises dissolving iron oxide in the molten carbonate in the presence of a lithium salt.

10. The method of claim 1, wherein carbothermal carbon dioxide emission is eliminated.

11. The method of claim 1, wherein the ratio of iron oxide to molten lithium carbonate ranges from about 20 weight percent to about 60 weight percent.

12. The method of claim 1, wherein about 7 to about 14 moles of iron oxide is solubilized per kilogram of molten carbonate.

13. The method of claim 1, wherein about 0.7 to about 4 moles of iron oxide is solubilized per kilogram of molten carbonate.

14. A method of producing steel comprising:
(i) solubilizing iron oxide in a molten carbonate comprising lithium carbonate to form a lithiated iron oxide; and
(ii) subjecting the lithiated iron oxide and the molten carbonate to electrolysis to obtain steel and oxygen.

15. The method of claim 14, wherein the iron oxide comprises $Fe_2O_3$.

16. The method of claim 14, wherein the molten carbonate is a mixed eutectic molten carbonate.

17. The method of claim 14, wherein the molten carbonate further comprises $Li_2O$.

18. The method of claim 14, wherein the iron oxide comprises $Fe_3O_4$.

19. The method of claim 14, wherein the iron oxide comprises impurities.

20. The method of claim 14, wherein step (ii) occurs with carbon dioxide in contact with the molten carbonate.

21. The method of claim 14, wherein the solubilizing in step (i) comprises dissolving iron oxide in the molten carbonate.

22. The method of claim 10, wherein the solubilizing in step (i) comprises dissolving iron oxide in the presence of a lithium salt.

23. A method of producing iron comprising:
(i) dissolving iron oxide in a molten carbonate salt comprising lithium carbonate at a temperature sufficient to solubilize the iron oxide as lithiated iron oxide; and
(ii) subjecting the lithiated iron oxide to electrolysis to obtain iron and oxygen.

24. A method of producing steel comprising:
(i) dissolving iron oxide in a molten carbonate salt comprising lithium carbonate at a temperature sufficient to solubilize the iron oxide as lithiated iron oxide; and
(ii) subjecting the lithiated iron oxide and the molten carbonate to electrolysis to obtain steel and oxygen.

25. A method of producing iron comprising:
(i) solubilizing an oxide consisting essentially of iron oxide in a molten carbonate comprising lithium carbonate to form a lithiated iron oxide;
(ii) optionally adding a lithium salt; and
(iii) subjecting the lithiated iron oxide to electrolysis to obtain iron and oxygen.

26. The method of claim 25, wherein the lithium salt is $Li_2O$.

* * * * *